(12) United States Patent
Viitanen

(10) Patent No.: US 7,884,582 B2
(45) Date of Patent: Feb. 8, 2011

(54) METHOD AND DEVICE IN FREQUENCY CONVERTER

(75) Inventor: Tero Viitanen, Vantaa (FI)

(73) Assignee: ABB OY, Helsinki (FI)

( * ) Notice: Subject to any disclaimer, the term of this patent is extended or adjusted under 35 U.S.C. 154(b) by 0 days.

(21) Appl. No.: 12/626,413

(22) Filed: Nov. 25, 2009

(65) Prior Publication Data

US 2010/0142238 A1 Jun. 10, 2010

(30) Foreign Application Priority Data

Nov. 28, 2008 (FI) .................................. 20086142

(51) Int. Cl.
*G05F 1/70* (2006.01)
*H02M 7/217* (2006.01)
(52) U.S. Cl. .......................... 323/207; 363/127; 363/46
(58) Field of Classification Search ................. 323/207; 363/127, 46
See application file for complete search history.

(56) References Cited

U.S. PATENT DOCUMENTS

| 5,742,103 | A | 4/1998 | Ashok |
| 5,808,882 | A * | 9/1998 | Mochikawa .................. 363/46 |
| 7,088,081 | B2 * | 8/2006 | Takahashi et al. ........... 323/222 |
| 7,605,570 | B2 * | 10/2009 | Liu et al. ..................... 323/207 |
| 2006/0119337 | A1 | 6/2006 | Takahashi et al. |
| 2007/0114962 | A1 | 5/2007 | Grbovic |

FOREIGN PATENT DOCUMENTS

WO WO 02/080347 A2 10/2002

OTHER PUBLICATIONS

Finnish Search Report for Finnish Patent Appl. No. 20086142 dated Oct. 26, 2009.
Finnish Office Action for Finnish Patent Appl. No. 20086142 dated Oct. 27, 2009.
W. Wu et al., "A Novel Current-Followed Single-Phase PFC Converter", Power Electronics and Drive Systems 2001 Proceedings, 2001 4th IEEE International Conference, pp. 157-162.
J.C. Salmon et al., "Operation, Control and Performance of a Family of High Power Unity Power Factor Rectifiers", Electrical and Computer Engineering 1995, Canadian Conference on Montreal, Quebec, Canada, Sep. 5-8, 1995, pp. 854-857.
"Power Factor Correction Equipment for Visual Display Units" IBM Technical Disclosure Bulletin, 1994, vol. 37, No. 5, pp. 359-361, XP000453182.
European Search Report issued in the corresponding Application No. 09176815.0-2207 dated Mar. 4, 2010.

* cited by examiner

*Primary Examiner*—Shawn Riley
(74) *Attorney, Agent, or Firm*—Buchanan Ingersoll & Rooney PC

(57) ABSTRACT

A method in connection with a frequency converter for correcting the power factor of the frequency converter, and a power factor correction unit. The method includes connecting the power factor correction unit between a rectifier bridge of the frequency converter and the supplying AC voltage network, generating with the power factor correction unit DC voltage from the AC voltage of the supply network and feeding the generated DC voltage to the frequency converter via the rectifier bridge of the frequency converter.

5 Claims, 3 Drawing Sheets

METHOD AND DEVICE IN FREQUENCY CONVERTER

BACKGROUND OF THE INVENTION

The invention relates to frequency converters, and in particular, to improvement of the waveform of the frequency converters' input supply current.

The input supply current of a typical 1- or 3-phase supplied diode rectifier is highly distorted. FIG. 1 shows an example of a frequency converter to be connected to a 1-phase supply network, the frequency converter consisting of a diode rectifier 1, a DC intermediate circuit 2 and an inverter capable of supplying 3-phase load.

One or more capacitors of the intermediate circuit on the DC voltage side of the rectifier constitute an energy storage of the inverter. At the same time the voltage charged in the capacitor limits the conduction time of a diode bridge, because, as known, energy is transferred to a DC voltage intermediate circuit only when a main voltage of the supplying network is higher than the DC voltage of the intermediate circuit. Consequently, energy is transferred to the intermediate circuit only at short periods close to peak value time instants of network voltage. Thus, the energy transferred to the intermediate circuit is transferred in high and short current spikes.

High current spikes increase the effective value of an input current of a device, whereby fuse protection and thermal rating of cables, for instance, must be oversized in relation to the actual efficiency to be utilized. In addition, high current spikes increase stresses of all components exposed thereto. FIG. 2 shows an example of a situation, where the 3.3 kW DC power of a rectifier having a capacitive DC voltage circuit energy storage is generated without additional filtering, whereby current spikes are only limited by impedances of a transformer and cables of the AC network. The maximum value of a current spike is about 100 A and the effective value is about 28.8 A. If the same average power were transferred in a sinusoidal current having the same phase with the voltage, the peak value of the current would only be about 20.3 A and the effective value about 14.3 A.

In order to reduce the current spikes, i.e. to filter the supply current, a passive choke is often added to the rectifier. A drawback with this procedure is that the size, weight and price of the choke required increase considerably as the need for filtering increases. Moreover, voltage loss taking place in the choke $$u = L\frac{di}{dt}$$

increases along with the filtering need, because filtering capacity is added by increasing the choke inductance L.

One way to reduce current distortion is to replace the diode rectifier by a rectifier including active power factor correction, whereby the device always has supply current of good quality. A drawback with the active power factor correction is that the structure of the actual device, such as a frequency converter will change, and consequently, the manufacturing costs thereof will also often increase. The increase in costs poses a particular problem in a situation, where the quality of supply current is not relevant to the client, and the increased costs do not provide any actual added value for the client. A corresponding situation arises in connection with the quality standards of supply current, because the same product may be used in areas where highly different standards prevail, the standards being stricter in some areas regarding network effects.

BRIEF DESCRIPTION OF THE INVENTION

The object of the invention is to provide a method and a device implementing the method such that above problems will be solved. This is achieved with a method and a device, which are characterized by what is stated in the independent claims. Preferred embodiments of the invention are disclosed in the dependent claims.

The invention is based on the idea that between a frequency converter and the supply network there is provided to be connected a separate electrotechnical device, which acts as a power factor correction circuit. An optional device of this kind may be connected directly between the frequency converter and the supply network, and no changes need to be performed in the actual frequency converter.

According to the inventive idea, the power factor correction circuit forms a DC voltage at its output. This DC voltage is further supplied to a rectifying part of an inverter, the rectifying part being included in the conventional configuration of a typical inverter. The rectifying part of the typical inverter consists of a diode bridge whose diodes are designed to operate at the supply frequency. In other words, the diodes of the network bridge of the standard frequency converters are not applicable to use at higher frequencies. In accordance with the solution of the invention, the device to be connected between the network bridge and the supply network is implemented by switch components that are able to operate at said frequencies higher than the basic network frequency, and are thus capable of correcting the power factor. Because the voltage supplied to the input of the frequency converter is DC voltage, the diodes to be used in the input bridge may be utilized as such.

The method and the device of the invention have an advantage of providing a simple structure that enables utilization of conventional frequency converters, taking into account various requirements, if any, in the applications without having to make changes in the frequency converter.

Further, the solution of the invention avoids drawbacks resulting from large choke components, and the curve form of the supply current in the frequency converter may be modified to correspond to the curve form and phase angle of the network voltage.

BRIEF DESCRIPTION OF THE DRAWINGS

In the following the invention will be described in greater detail in connection with preferred embodiments, with reference to the attached drawings, in which.

DETAILED DESCRIPTION OF THE INVENTION

Figure 1:
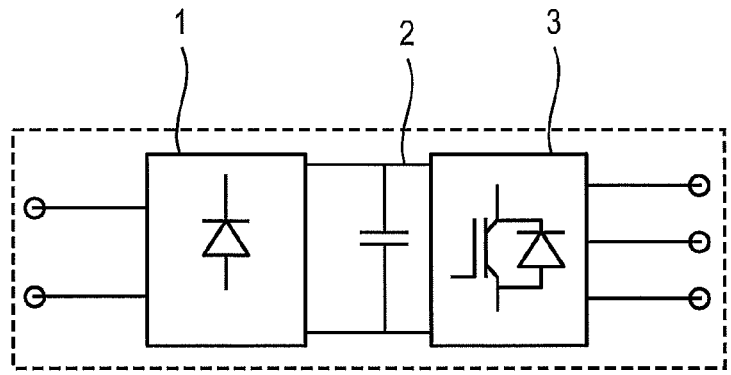
FIG. 1 is a block diagram of a frequency converter.
Figure 2:
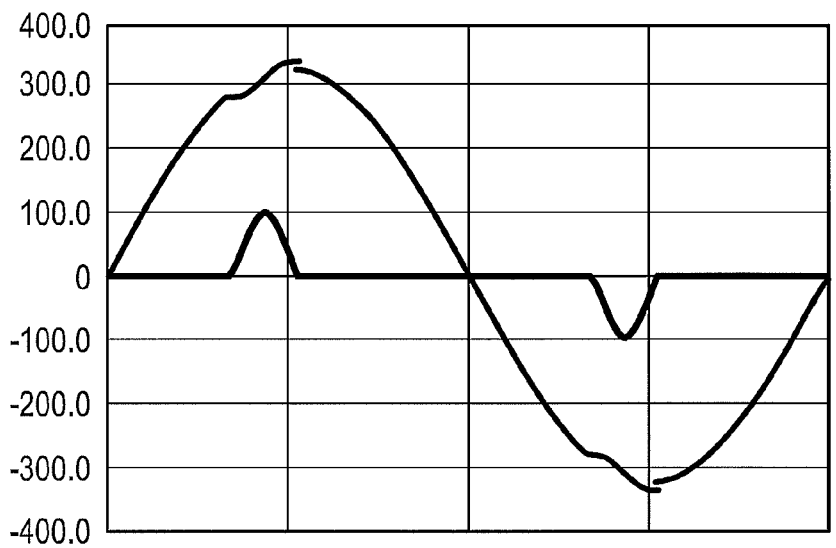
FIG. 2 shows supply current and voltage of a frequency converter provided with a diode bridge.
Figure 3:
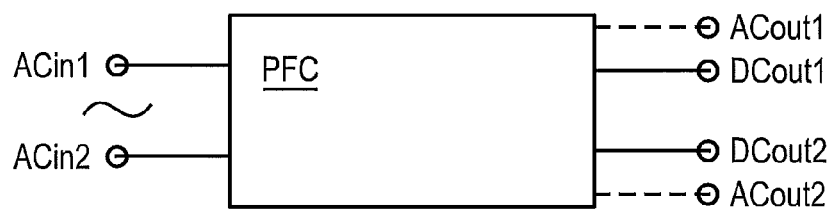
FIG. 3 shows a power factor correction unit of the invention.

FIG. 3 shows a block diagram of a device in accordance with the invention that is connectable as a unit between the supplying AC voltage network and a rectifier bridge of a frequency converter. The device PFC of the invention comprises input poles ACin1 and ACin2, the device being intended for a single-phase system. Correspondingly, a device intended for a three-phase system comprises three input poles, as will be described later on in the text with reference to FIG. 7. Further, the device of FIG. 3 comprises two output poles DCout1 and DCout2 and between them a DC voltage that can be supplied to the input of the frequency converter in accordance with the invention, or to put it more precisely, to the input of the network converter, i.e. rectifier, of the frequency converter. FIG. 3 also shows AC voltage outputs ACout1 and ACout2, which will be described below.

Figure 5:
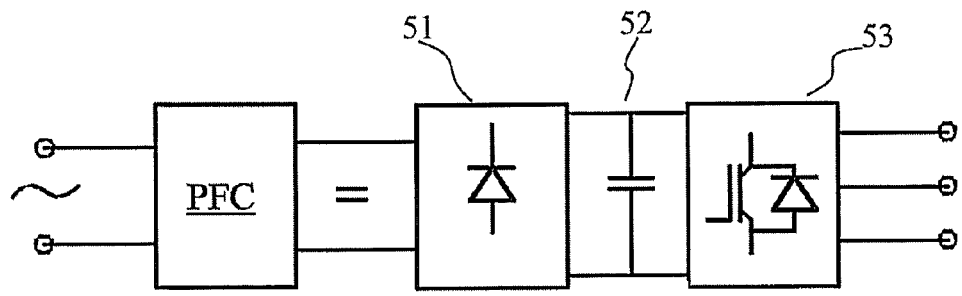
FIG. 5 is a block diagram of the power factor correction unit of the invention connected to the frequency converter.

FIG. 5 shows the device of the invention as connected between the frequency converter input and the supply network. The power factor correction circuit PFC receives a single-phase voltage and forms from this voltage a DC voltage to be supplied to a diode bridge 51 of the frequency converter, i.e. to the input of the frequency converter. Because the voltage produced by the power factor correction circuit is DC voltage, the diode bridge passes the voltage as such to a capacitor 52 of an intermediate circuit. Further, an inverting part, i.e. inverter 53, is capable of forming from this DC voltage of the intermediate circuit an AC voltage for controlling a load in a conventional manner.

Because, in accordance with the invention, the voltage supplied to the rectifier is DC voltage, in the case of single-phase supply, only two diodes are loaded in the diode bridge. Examination of the matter has revealed that, despite uneven loading, the load of these loaded diodes does not change much in view of the original use. This is due to the fact that when the power factor correction unit is used, the input current is almost sinusoidal, whereby the effective value of the current is nearly halved in contrast to a situation, where the power factor correction circuit is not used.

Figure 6:
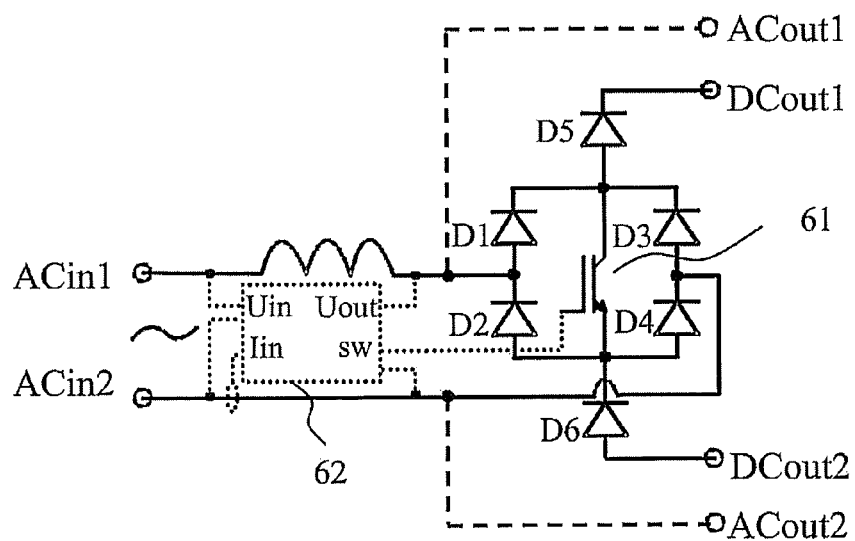
FIG. 6 shows an example of a power factor correction circuit for a single-phase supply network.

FIG. 6 shows a circuit suitable for correcting the power factor. The shown circuit is a boost-type, i.e. voltage raising circuit, in which one controllable semiconductor switch 61 provides power factor correction in a desired manner. In this circuit there operates an independent element 62, which receives the necessary operating voltage from the supply, performs the necessary measurements and controls independently the required power semiconductor 61 to provide the desired effect. The necessary measurements performed by the element 62 include the presented measurements of input voltage Uin, output voltage Uout and input current Iin. For the control the element may also need information on the voltage of the intermediate circuit constituting the load of the PFC circuit, which voltage may be determined by measuring the voltage between the presented output connectors ACout1 and ACout2, the active switch 61 being in non-conducting state, when the current passing through the connectors ACin1 and ACin2 deviates from zero. Hence, the only external connectors of the unit are the input and output connectors required for connection of the unit.

FIG. 6 shows a circuit, which comprises diodes D1, D2, D3 and D4 constituting a rectifier bridge, and diodes D5 and D6. In addition, the circuit comprises said controllable switch 61 that is connected to the element 62 for receiving control data sw. Moreover, the circuit has a relatively small inductance, which is typical of boost circuits. FIG. 6 does not show filtering, which is to be connected between the outputs DCout1 and DCout2 of the circuit. A light CL-type filter consisting of a capacitor and inductance will be sufficient for filtering.

Because the device of the invention is a voltage raising, so-called boost-type device, it also allows two systems of different voltages to be adapted to one another in a simple manner, while achieving the advantages of the invention. For instance, the device of the invention to be connected to a supply network of 115V may feed a frequency converter designed for 230V voltage.

Figure 4:
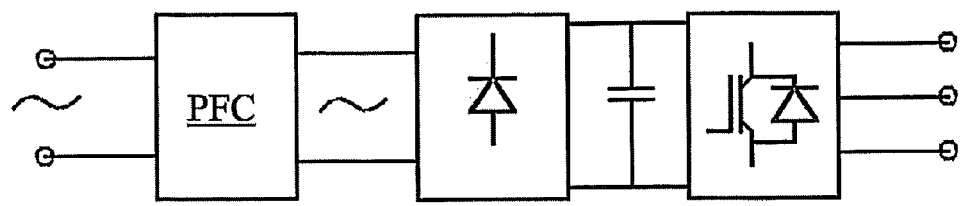
FIG. 4 shows an alternative structure for correcting the power factor.

FIGS. 3 and 6 also show, in broken lines, outputs ACout1 and ACout2 in the device of the invention. These outputs are for an alternative solution, in which the input bridge of the frequency converter includes fast diodes. A block diagram in accordance with this principle is shown in FIG. 4, in which a device connected in front of a frequency converter produces AC voltage that is connected to the input of the diode bridge of the frequency converter. The power factor correction circuit produces then high-frequency AC voltage for its output that is to be rectified in an inverter. As stated above, the input bridges of the inverters are formed of diodes capable of commutating typically at the network frequency, and therefore, in general, the input bridge of the frequency converter is not capable of treating such a high-frequency AC voltage in a desired manner.

However, if the network bridge consists of fast diodes, for instance of fast recovery type, it is conceivable that the power factor correction circuit produces AC voltage for the frequency converter. It appears from the circuit of FIG. 6 that the DC voltage output DCout1, DCout2 is formed in the circuit by rectifying the AC voltage output ACout1, ACout2 with diodes D1, D2, D3, D4, D5, D6. In other words, the same power factor correction circuit produces both DC voltage output and AC voltage output using only one controllable component.

Figure 7:
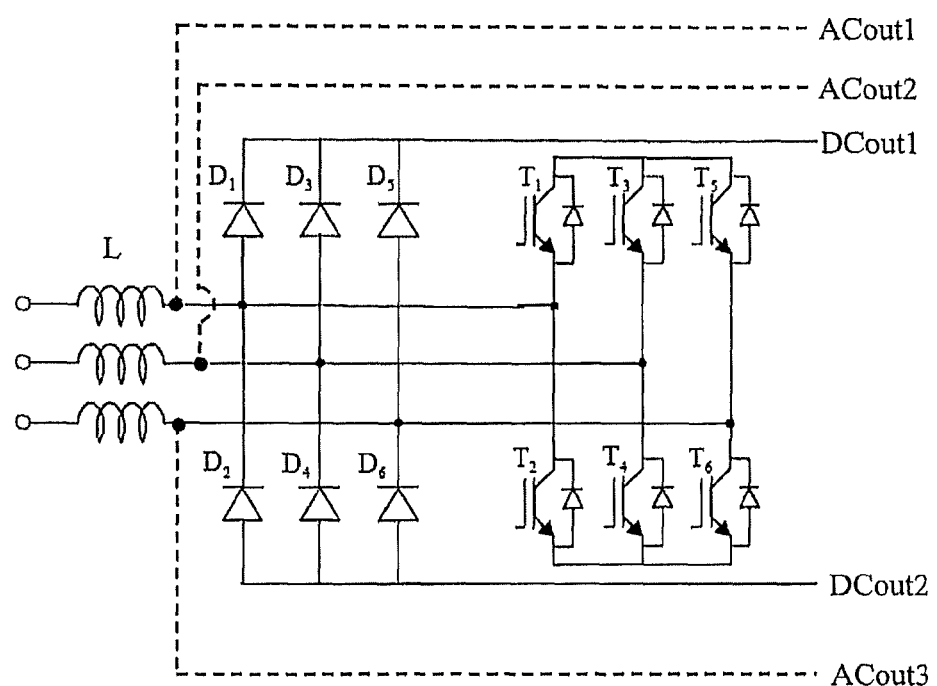
FIG. 7 shows an example of a power factor correction circuit for a 3-phase supply network.

FIG. 7 shows an example of the device of the invention which is suitable for use in connection with a 3-phase supply voltage. This device comprises a 3-phase diode bridge consisting of diodes $D_1$, $D_2$, $D_3$, $D_4$, $D_5$, $D_6$ and controllable switches $T_1$, $T_2$, $T_3$, $T_4$, $T_5$, $T_6$ connected to the bridge, by which switches it is possible to short circuit instantaneously the input phases such that the voltage of inductances L connected to the input of the bridges may be set so as to achieve a desired power factor correction operation. The circuit of FIG. 7 comprises two outputs DCout1, DCout2, which are connected, in accordance with the invention, to the inputs of the 3-phase diode bridge of the frequency converter such that one of the inputs is left unused. Thus, the 3-phase rectifier bridge of the frequency converter only employs two of the six diodes, yet the end result is that the advantages of the invention, i.e. the improved network properties, are achieved without changes in the actual frequency converter, and the frequency converter may be used in the usual manner. In the same way as in connection with FIG. 6, a filter is to be connected to the output of the circuit in FIG. 7.

If the 3-phase input bridge of the frequency converter is provided with fast diodes, it is possible to supply 3-phase AC voltage with the power factor correction unit to the input bridge of the frequency converter by using the outputs ACout1, ACout2, ACout3 depicted in broken lines. As appears from FIG. 7, the voltage of these AC outputs is rectified to form DC outputs by using the diodes of the power factor correction circuit. Hence, the same switch control allows generation of both AC output and DC output voltages.

It is clear that the inventive idea may be implemented by any unit which performs the power factor correction and which may be optionally connected between the frequency converter and the supply network. According to the invention, the frequency converter is supplied with DC voltage, whereby there will be no need to make changes in the input bridge of the frequency converter. The fact that the device of the invention is coupled in said manner enables employment of a smaller fuse size in the voltage feed and the supply network need not be reinforced for harmonics produced by the inverter.

It is apparent to a person skilled in the art that the basic idea of the invention may be implemented in a variety of ways. Thus, the invention and the embodiments thereof are not restricted to the above-described examples, but they may vary within the scope of the claims.

The invention claimed is:

1. A method in connection with a frequency converter for correcting the power factor of the frequency converter the method comprising:
   connecting a power factor correction unit between a rectifier bridge of the frequency converter and the supplying AC voltage network,
   generating DC voltage with the power factor correction unit from the AC voltage of the supplying network,
   feeding the generated DC voltage to the frequency converter via the rectifier bridge of the frequency converter.

2. The method of claim 1, wherein generation of DC voltage by the power factor correction unit also comprises a step of raising the magnitude of DC voltage with respect to the magnitude of the rectified network voltage.

3. The method of claim 1, wherein generation of DC voltage by the power factor correction unit comprises steps of
   performing measurements of one or more voltages or currents in the power factor correction unit and
   controlling one or more controllable switch components of the power factor correction circuit included in the power factor correction unit on the basis of the measurements performed in the power factor correction unit.

4. A power factor correction unit for a frequency converter, comprising input connectors for connecting to AC voltage supply,
   one or more current and/or voltage measurements, which are arranged to measure internal quantities of the power factor correction unit,
   output connectors for connecting the power factor correction unit to the rectifier bridge of the frequency converter,
   a power factor correction circuit, which is arranged to perform a power factor correction on the basis of the internal measurements of the power factor correction unit and to generate for its output connectors a DC voltage that is arranged for supply to the rectifier bridge of the frequency converter.

5. The method of claim 2, wherein generation of DC voltage by the power factor correction unit comprises steps of
   performing measurements of one or more voltages or currents in the power factor correction unit and
   controlling one or more controllable switch components of the power factor correction circuit included in the power factor correction unit on the basis of the measurements performed in the power factor correction unit.

* * * * *